United States Patent [19]

Lachowicz et al.

[11] 3,862,105

[45] Jan. 21, 1975

[54] NITROXIDIZED POLYMERS HAVING NITRO AND PEROXY NITRATE FUNCTIONS THEREIN

[75] Inventors: Donald R. Lachowicz, Fishkill; Charles B. Holder, Wappingers Falls, both of N.Y.

[73] Assignee: Texaco Inc., New York, N.Y.

[22] Filed: Jan. 22, 1973

[21] Appl. No.: 325,469

Related U.S. Application Data

[62] Division of Ser. No. 148,144, May 28, 1971, Pat. No. 3,751,522.

[52] U.S. Cl............ 260/80.78, 260/94.7 N, 260/877, 260/878, 260/879

[51] Int. Cl....................... C08f 15/40, C08f 17/00

[58] Field of Search......... 260/877, 94.7 N, 80, 178

[56] References Cited
UNITED STATES PATENTS 3,751,522   8/1973   Lachowicz et al................. 260/877
3,751,523   8/1973   Lachowicz et al................. 260/877

*Primary Examiner*—Murray Tillman
*Assistant Examiner*—Richard B. Turner
*Attorney, Agent, or Firm*—T. H. Whaley; C. G. Ries

[57] ABSTRACT

Graft copolymers are prepared in a two-stage process by first reacting, for example, 1,2-polybutadiene or an ethylene/propylene/alkylidene norbornene terpolymer, with a mixture of dinitrogen tetroxide and oxygen to form a nitrooxidized backbone polymer having incorporated therein nitro and peroxy nitrate functions which serve, in the second stage of the process, as sites for the subsequent graft polymerization of an acrylate monomer.

3 Claims, No Drawings

NITROXIDIZED POLYMERS HAVING NITRO AND PEROXY NITRATE FUNCTIONS THEREIN

This is a division of application Ser. No. 148,144, filed May 28, 1971, Patent No. 3,751,522.

BACKGROUND OF THE INVENTION

1. Field of the Invention

This invention relates to graft copolymers and, in particular, to the grafting of an acrylate onto a backbone chain of a dissimilar polymer.

2. Description of the Prior Art

The preparation of a wide variety of graft copolymers has been described in the art. For example graft copolymers can be prepared as described in U.S. Pat. No. 3,507,932 by oxidizing a methacrylic homopolymer, such as isopropyl methacrylate, with air to form a hydroperoxide derivative and then reacting the said derivative with a high molecular weight methacrylate ester thus forming a graft copolymer. Prior to this invention, however, no process existed for preparing a graft copolymer of an acrylate with a backbone polymer such as a 1,2-polybutadiene, in which an intermediate product formed by reacting the 1,2-polybutadiene with a mixture of dinitrogen tetroxide and oxygen is further reacted and polymerized with an acrylate monomer.

One object of this invention is to provide a process for preparing graft copolymers by copolymerizing an unsaturated hydrocarbon polymer previously treated with a mixture of dinitrogen tetroxide and oxygen to form reactive sites therein, with an acrylate monomer.

Another object of this invention is to graft an acrylate monomer to a dissimilar backbone polymer while avoiding crosslinking.

BRIEF SUMMARY OF THE INVENTION

In the process of this invention graft copolymers are prepared by:

A. contacting a backbone polymer having a saturated hydrocarbon chain portion and a plurality of pendant hydrocarbon groups each containing a moiety of the formula:

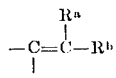

wherein $R^a$ and $R^b$ are independently selected from the group consisting of hydrogen and alkyl of from 1 to 16 inclusive carbon atoms, with a mixture of dinitrogen tetroxide and oxygen to form an intermediate backbone polymer product having incorporated therein nitro and peroxy nitrate groups, and B. reacting said intermediate backbone polymer product with an acrylate of the formula:

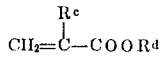

wherein $R^c$ is hydrogen or alkyl of from 1 to 3 inclusive carbon atoms and $R^d$ is alkyl of from 1 to 30 inclusive carbon atoms, to form a graft copolymer.

The thermoplastic copolymers of this invention, which can be extruded or molded, can be utilized to prepare sheet, rods, housings for radios, signal light lenses, etc. A wide variety of glass and asbestos fiber reinforced plastic compositions which exhibit excellent mechanical properties can be prepared using the copolymers of this invention.

DETAILED DESCRIPTION OF THE INVENTION

First Stage

In the first stage reaction, the backbone polymer is contacted simultaneously with a mixture of dinitrogen tetroxide and oxygen to form an intermediate polymeric product containing both nitro and peroxy nitrate functions. It is to be noted that the nitro and peroxy nitrate groups form on either olefinic carbon when both of the latter have the same number of hydrogens attached and the intermediate product is actually a mixture of compounds. When the olefin group is terminal, the nitro group attaches itself to the terminal olefinic carbon.

The intermediate polymeric product formed in the first stage comprises a hydrocarbon chain portion and a plurality of pendant groups containing a moiety of the formula:

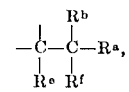

wherein $R^a$ and $R^b$ are independently selected from the group consisting of hydrogen and alkyl of from 1 to 16 inclusive carbon atoms and wherein $R^e$ and $R^f$ are independently selected from the group consisting of $OONO_2$ and $NO_2$ and with the proviso that when $R^e$ is $OONO_2$ then $R^f$ is $NO_2$ and when $R^e$ is $NO_2$ then $R^f$ is $OONO_2$.

The intermediate polymeric compound, i.e., the nitrooxidized backbone polymer, formed in the first stage of the process of this invention when a mixture of dinitrogen tetroxide and oxygen is reacted with, for example, a 1,2-polybutadiene have recurring units of the formula:

(a) 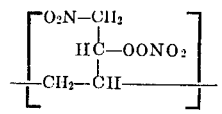

while backbone polymers having, for example, recurring 5-methylene-2-norbornene units yield intermediate polymeric products containing units of the formula:

(b) 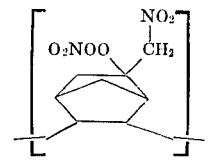

The formed nitrooxidized backbone polymer product can be recovered from the reaction mixture at the conclusion of the first stage reaction, if desired, by stripping off the solvent.

The reaction temperature employed is advantageously between about −30° and 20°C. Higher reaction temperatures tend to facilitate the decomposition of the peroxy nitrate product and at temperatures below the prescribed range the dinitrogen tetroxide would not function due to its inability to dissociate into monomeric nitrogen dioxide.

The amount of dinitrogen tetroxide employed in the first stage which can be varied over a wide range generally will be from about 0.00001 to about 0.01 mole per gram of the backbone polymer charged to the reactor; the actual amount employed depends on the C=C equivalents/gram of backbone polymer desired to be reacted. The reactant mole ratio of dinitrogen tetroxide to oxygen utilized is normally between about 0.5:1 and 0.05:1. However, the important aspect of the reactant ratio of this mixture is that the moles of oxygen be at least equivalent and preferably in excess to the moles of dinitrogen tetroxide. If the ratio of $N_2O_4$ is above that of oxygen another $NO_2$ group forms rather than the desired peroxy group. Excess oxygen even in excess of the stated range does not deleteriously affect the reaction.

The oxygen employed may be in the pure form or in the diluted form such as air or in admixture with inert gases such as nitrogen and argon. Under advantageous conditions the oxygen is introduced into the reaction system at a rate of between about 0.1 and 100 mls. (STP)/min/gram of backbone polymer. The reaction time is normally between about ½ and 10 hours although longer or shorter periods may be employed.

It is to be noted that the nitrating agent, dinitrogen tetroxide, is actually an equilibrium mixture of dinitrogen tetroxide and nitrogen dioxide with the equilibrium being driven to essentially 100% nitrogen dioxide at 140°C. Under advantageous conditions, the nitrating agent is normally introduced into the reaction system at a rate of between about 0.002 and 0.2 gram/min/gram of backbone polymer; however, the actual rate depends in large measure upon the rate of heat removal from the reaction system.

To promote contact of the reactants in the first stage, the reaction is desirably carried out under conditions of agitation in the presence of an inert liquid diluent, for example, inert liquids having a boiling point between about 30° and 100°C such as n-hexane, n-heptane, carbon tetrachloride and diethylether.

Polymers having recurring units of the formula:

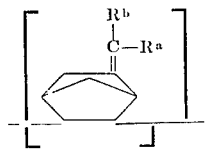

wherein $R^a$ and $R^b$ have the same meaning as previously defined are referred to herein as norbornene polymers.

Norbornene polymers useful as backbone polymers in this invention include homopolymers prepared, for example, from the 5-alkylidene-2-norbornenes such as 5-methylidine-2-norbornene (also called 5-methylene-2-norbornene), 5-ethylidene-2-norbornene, 5-isobutylidene-2-norbornene, 5-n-heptylidene-2-norbornene, 5-n-heptadecylidene-2-norbornene, 5-n-tridecylidene-2-norbornene, etc. Mixtures of the homopolymers may be employed, if desired. Such homopolymers can be prepared by contacting a solution of the 5-alkylidene-2-norbornene in benzene with a solution of a catalyst comprising titanium tetrachloride and lithium aluminum tetraheptyl in which the mole ratio of the titanium tetrachloride to the lithium aluminum tetraheptyl is more than one as more completely described by Sorensen and Campbell, Preparative Methods of Polymer Chemistry, Interscience Publishers, N.Y., 1968, p. 427.

The 5-alkylidene-2-norbornene monomers can be prepared by isomerizing the corresponding 2-alkylnorbornadiene in the presence of a catalyst, such as p-toluene sulfonic acid or aluminum chloride, as described in Nyce U.S. Pat. No. 3,151,173.

Terpolymers of these same 5-alkylidene-2-norbornenes are highly useful as backbone polymers in the process of this invention. These polymeric materials are terpolymers of ethylene, at least one alpha olefin having the structure:

$R—CH=CH_2$, where R is a $C_1$–$C_8$ alkyl radical, and a 5-alkylidene-2-norbornene, the said terpolymer having an iodine number between 2 to 60 and containing by weight about 20 to 76.4 percent $R—CH=CH_2$ monomer units, and about 3.6 to 20 percent 5-alkylidene-2-norbornene monomer units.

Representative examples of such terpolymers include: ethylene/propylene/5-methylidene-2-norbornene; ethylene/propylene/5-ethylidene-2-norbornene; ethylene/propylene 5-isobutylidene-2-norbornene; ethylene/propylene/5-n-heptylidene-2-norbornene; ethylene/1-butene/5-heptadecylidene-2-norbornene; ethylene/1-butene/5-ethylidene-2-norbornene; ethylene/1-butene/5-n-decylidene-2-norbornene; ethylene/4,4-dimethyl-1-hexane/5-ethylidene-2-norborene; ethylene/5,5-dimethyl-1-octene/5-isopropylidene-2-norbornene; ethylene/6-methyl-1-heptene/5-n-tridecylidene-2-norbornene and ethylene/5,6,6-trimethyl-1-heptene/5-ethylidene-2-norbornene. Mixtures of the terpolymers may be used, if desired.

Preparation of the above-described terpolymers can be accomplished as set forth in U.S. Pat. No. 3,151,173 by contacting ethylene, at least one alpha olefin and at least one 5-alkylidene-2-norbornene is solution in inert solvents with coordination catalysts, at temperatures between −20° and 70°C at atmospheric, subatmospheric, or superatmospheric pressure; and in the absence of catalyst poison such as oxygen, water, and carbon dioxide.

A second group of backbone polymers which are highly useful as starting materials in the process of this invention include polymers having recurring units of the formula:

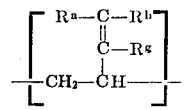

wherein $R^a$, $R^b$ and $R^c$ are independently selected from the group consisting of hydrogen, and alkyl of from 1 to 16 carbon atoms. Examples of useful backbone polymers of this type include polymers having recurring units as shown below:

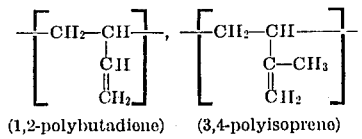

(1,2-polybutadiene)    (3,4-polyisoprene)

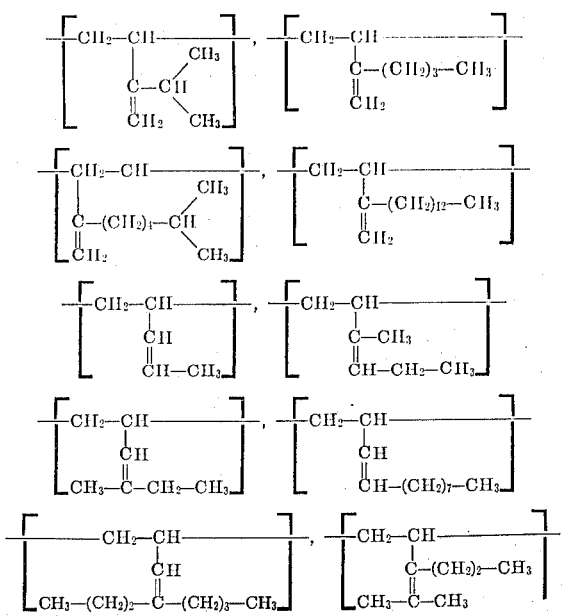

The 1,2-polydienes, such as the 1,2-polybutadienes, can be formed in a variety of ways well known in the art. For example, 1,3-butadiene can be polymerized in tetrahydrofuran in the presence of butyl lithium at a temperature of about 5° to about 70°C to give 1,2-polybutadiene of molecular weight of from about 5,000 to about 10,000 or more. 3,4-Polyisoprene can be prepared by homopolymerization of isoprene in the presence of aluminum triethyl and tetra-n-propyl titanate for about 8 hours at a temperature of 24°C, as more completely described by Sorensen et al, ibid, p.321-2.

Second Stage

In the second stage the grafting of an acrylate monomer takes place at the peroxy nitrate sites through the mechanism of a free radical polymerization. The intermediate polymer product formed in the first stage thus provides not only the sites for the graft polymerization but also the free radicals necessary to initiate the polymerization of the acrylate monomer.

After the first stage reaction has been completed and the unsaturated polymer having nitro and peroxy nitrate groups incorporated therein has been formed, an inert purge gas such as nitrogen is passed through the reaction mixture and continued until any dissolved oxygen has been removed. The acrylate monomer, which may be dissolved in an inert solvent such as ether, n-hexane or benzene, etc., if desired, is then added to the polymer solution either before or after the inert purge gas sweep is commenced.

Useful acrylate monomers have the formula:

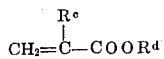

wherein $R^c$ is hydrogen or alkyl of from 1 to 3 inclusive carbon atoms as exemplified by methyl, ethyl, propyl and isomers thereof, and $R^d$ is alkyl of from 1 to 30 inclusive carbon atoms as exemplified by methyl, ethyl, propyl, butyl, pentyl, hexyl, octyl, nonyl, decyl, undecyl, hexadecyl, heptadecyl, octadeyl, nonadecyl, eiosyl, docosyl, pentacosyl, and isomers thereof. Mixtures of these acrylates may be employed, if desired.

In the second stage, in which apparently graft copolymerization takes place, the reaction mixture is heated to decompose the peroxy nitrate sites in the backbone polymer. Generally the reaction mixture is heated to a temperature of from about 35° to about 175°C and, preferably, at a temperature of about 80° to about 130°C. The second stage reaction may be conducted under refluxing conditions. Heating is continued until the desired degree of graft polymerization has been accomplished. The course of the reaction can be followed by measurement, for example, of the refractive index of the mixture or by determining some other easily measurable physical property.

The extent of the grafting achieved is directly dependent on the extent of the peroxy nitrate formation. One skilled in the art can prepare the desired graft copolymer by carefully selecting the necessary reaction conditions, such as time, temperature, etc. in the first and second stages of the process of this invention.

Recovery of the product from the reaction mixture can be accomplished by a variety of methods well known in the art such as by the addition of methanol or acetone to precipitate the product which can be recovered by decantation, centrifugation, filtration, etc. or the crude polymer can be redissolved in a suitable solvent such as chloroform, benzene or toluene, etc. and re-precipitated in purified form by addition of methanol or acetone to the polymer solution. Fractional precipitation may be utilized to identify the final polymer as a true graft polymer of the backbone polymer and the acrylate.

A relatively small amount of dinitrogen tetroxide should be used in the first stage when backbone polymers of the ethylene/propylene/5-ethylidene-2-norbornene type is employed (i.e., about 0.00001 to about 0.001 mole of $N_2O_4$ g of polymer or less). Also, it has been found advantageous to add the acrylate within about 1 to about 10 minutes after the nitrogen tetroxide first stage reaction has been completed.

The backbone polymers utilized in forming the novel graft copolymers of this invention generally will have molecular weights of from about 5000 to about 200,000 or more and, preferably, from about 10,000 to about 150,000. The final graft copolymer products will have molecular weights of from about 6500 to about 1,000,000 or more and, preferably, from about 15,000 to about 250,000.

Generally, the backbone polymer will make up about 5 to about 80 and, preferably, from about 10 to about 40 percent by weight of the final graft copolymer with the balance being furnished by the monomer which is grafted and polymerized onto the nitrooxidized backbone polymer.

The following examples illustrate various embodiments of this invention and are to be considered not limitative.

EXAMPLE I

Graft Copolymer of Methyl Methacrylate (MMA) on 1,2-Polybutadiene

Into a resin kettle equipped with a reflux condenser, a thermometer, a mechanical stirrer, and a gas inlet tube were place 5 g of 1,2-polybutadiene (molecular weight about 6,800) and 100 ml of n-hexane. The mixture was stirred at room temperature until the polymer dissolved following which the solution was cooled to ice bath temperature while purging it with oxygen (one-half hr). The gas inlet tube was connected to a graduated container of liquid dinitrogen tetroxide. A stream of oxygen (at a rate of 60.8 ml/min (STP)) was passed over the $N_2O_4$ and the resultant gaseous mixture ($N_2O_4/O_2$) was conducted into the reaction solution (at ice bath temperature) through the gas inlet tube. 0.4 ml of liquid $N_2O_4$ was transferred to the reaction solution in this manner over a period of 55 min. Oxygen alone was bubbled into the solution for the next one-half hr to allow complete reaction of the $N_2O_4$ with the 1,2-polybutadiene. The reaction system was evacuated and refilled three times with nitrogen and the solution was purged with nitrogen for one-half hr. Methyl methacrylate (25 ml) was dissolved in the reaction solution which was subsequently heated at 50°–55°C for 12 hr. After the reaction solution was cooled to room temperature it was added to methanol (1,500 ml) whereupon a polymeric product precipitated. The precipitated graft copolymer was dried in vacuo and weighed (yield — 7.8 g).

Sixty-eight percent of the recovered graft copolymer was found to be extractable with acetone. Infrared spectroscopic analysis of the acetone extract showed it to contain 45 percent methyl methacrylate while the product itself contained 43% (calculated from weights of starting material and gross product). The acetone-insoluble residue was calculated to contain 38 percent polymethyl methacrylate which as a homopolymer is acetone-soluble.

EXAMPLE II

Graft Copolymer of Butyl Methacrylate on an Ethylene/Propylene/5-Ethylidene-2-Norbornene Terpolymer Into a resin kettle equipped with a reflux condenser, a thermometer, a mechanical stirrer, and a gas inlet tube were placed 5.0 g of ethylene/propylene/5-ethylidene-2-norbornene terpolymer marketed by Copolymer Rubber and Chemical Corporation under the trademark EPsyn 40-A (molecular weight 76,000, raw Mooney viscosity (ML 8' at 250°F) 40, specific gravity 0.86, gel content — none) and 70 ml of n-heptane.

The mixture was stirred at room temperature until the polymer dissolved, following which the solution was cooled to ice bath temperature while purging it with oxygen (2 hr). Gaseous dinitrogen tetroxide (15.0 ml — STP) was injected into the solution with a hypodermic syringe and after stirring for 5 minutes, the oxygen in the system was replaced with nitrogen by evacuating the system and refilling it with nitrogen four times. Butyl methacrylate (50 ml) was added to the reaction solution (13 min after the addition of the dinitrogen tetroxide). The solution was subsequently heated at 80°C for 5 hr, after which it was diluted with benzene (100 ml) to decrease the viscosity of the solution. Methanol (400 ml) was added dropwise causing the graft copolymer formed to precipitate. The mixture was stirred with an additional 1,500 ml of methanol and the polymeric product was separated. The product was dissolved in benzene (200 ml) and re-precipitated by addition of 1000 ml of methanol in order to remove unreacted monomer and finally dried in vacuo. The weight of the dry graft copolymer recovered was 14.7 g.

A sample of the product (0.735 g), calculated to contain 0.25 g of the initial terpolymer was dissolved in benzene (30 ml). Acetone (90 ml) was slowly added to this solution, resulting in precipitation of an acetone-insoluble fraction amounting to 0.096 g. A similar procedure with 0.250 g of the initial terpolymer resulted in precipitation of 0.228 g. In addition, by infrared analysis it was shown that the acetone-insoluble fraction of the product contained an appreciable amount of polybutyl methacrylate which as a homopolymer is acetone-soluble.

EXAMPLE III–XIII

A number of additional runs were conducted in the same manner as described in Examples I and II above. Pertinent details relating to these examples are presented in Table 1.

TABLE 1

NITROOXIDATION OF POLYMERS AND GRAFT REACTIONS

| Example | Polymer (g) | Solvent (ml) | Vol Liq $N_2O_4$ ml[a] | Graft Reaction[b] | | |
|---|---|---|---|---|---|---|
| | | | | Monomer (ml) | Temp (0°C)/Time (hr) | Prod (g) |
| III | 1,2-PBD[d] (5.0) | n-Hexane (100) | 0.4[c] | MMA[e] (25) | RT/18 | 5.8 |
| IV | 1,2-PBD[d] (5.0) | n-Hexane (100) | 0.4[c] | MMA[e] (25) | RT/18; 72/55 | 7.7 |
| V | 1,2-PBD[d] (5.0) | n-Hexane (100) | 0.4[c] | MMA[e] (25) | 75/1; 81/1.5 | 7.4 |
| | Solvent (90 ml) was distilled from the reaction mixture during the first hour of heating. 5–10 percent of the product was lost during the work-up. | | | | | |
| VI | 1,2-PBD[d] (5.0) | n-Hexane (100) | 0.4[c] | MMA[e] (25) | RT/17; 72/1.3; 82/3.25 | 12.8 |
| | Solvent (70 ml) was distilled from the reaction mixture while heating at 72°C. Water (200 ml) was added prior to heating at 82°C. | | | | | |
| VII | 1,2-PBD[d] (5.0) | n-Hexane (100) | 0.4[c] | Styrene (25) | RT/19; 75/6 | 5.5 |
| VIII | 1,2-PBD[d] (5.0) | n-Hexane (100) | 0.4[c] | MMA[e] (25) | RT/3 days; 68–84/1.3; 84/3.5 | 13.8 |
| | Water (200 ml) and Triton X-305 added prior to heating at 68–84°C. solvent (40 ml) was distilled from the reaction mixture during the first heating period (68–84°C). (Triton X-305 is a nonionic surfactant.) | | | | | |
| IX | 1,2-PBD[d] (5.0) | n-Hexane (100) | 0.4[c] | Styrene(25) | RT/20; 67–84/1.2; 74/3.5 | 6.1 |
| | Solvent (40 ml) was distilled from the reaction mixture during the first heating period (67–84°C). | | | | | |
| X | EPsyn 55[f] (5.0) | Toluene (160) | 0.1 | MMA[e](30) | RT/16.3; 60/7 | 7.1 |
| | A 5 ml sample of reaction solution taken at commencement of 60°C heating yielded 0.15 g of polymer. | | | | | |
| XI | EPsyn 40-A[g] (5.0) | Toluene (160) | 0.1 | MMA[e] (30) | 60/7 | 7.0 |
| | Reaction solution began to gel within 1 min of MMA addition and 50 ml of benzene was added. | | | | | |

TABLE 1 – Continued

NITROOXIDATION OF POLYMERS AND GRAFT REACTIONS

| Example | Polymer (g) | Solvent (ml) | Vol Liq N$_2$O$_4$ ml[a] | Graft Reaction[b] | | |
|---|---|---|---|---|---|---|
| | | | | Monomer (ml) | Temp (0°C)/Time (hr) | Prod (g) |
| XII | EPsyn 40-A[g] (5.0) | n-Heptane (70) | 15 (gas) | BMA[h] (50) | 80/5 | 12.6 |
| | Lubrizol 817 (0.05 g) added to polymer solution (200 ml benzene) prior to last precipitation used to inhibit crosslinking on standing. | | | | | |
| XIII | EPsyn 40-A[g] (5.0) | n-Heptane (70) | 15 (gas) | BMA[h] (50) | 90/5 | 16.9 |
| | 0.05 g of Lubrizol 817 added as in Example XII. | | | | | |

[a] — N$_2$O$_4$ slowly transferred to reaction solution at 0°C using O$_2$ as carrier gas.
[b] — Graft reaction carried out under N$_2$ and after O$_2$ in system was replaced with N$_2$.
[c] — Equivalent to 7% of available polymer unsaturations.
[d] — 1,2-polybutadiene, molecular weight 6800.
[e] — Methyl methacrylate
[f] — An ethylene/propylene/5-ethylidene-2-norbornene terpolymer marketed by Copolymer Rubber and Chemical Corporation under the trademark EPsyn 55, molecular weight about 90,600, raw Mooney viscosity (ML-8' at 250°F) 55, specific gravity 0.86, gel content — none.
[g] — See Example II for description of EPsyn 40-A
[h] — Butyl methacrylate.

EXAMPLE XIII-A

Nitrooxidized 1,2-Polybutadiene

A total of 5.5 g of 1,2-polybutadiene (molecular weight about 17,000) together with 100 ml of n-hexane are charged to a resin kettle equipped with a reflux condenser, a thermometer, a mechanical stirrer, and a gas inlet tube. The polymer added is dissolved by stirring the mixture at room temperature following which the solution is cooled to ice bath temperature while purging it with oxygen (three-fourth hr). A stream of oxygen at the rate of 50 ml/min STP) is passed over liquid dinitrogen tetroxide held in a graduated container and the resultant gaseous mixture (N$_2$O$_4$/O$_2$) is passed into the reaction solution at ice bath temperature through the gas inlet tube. Over a period of 10 min 0.3 ml of liquid dinitrogen nitroxide is transferred to the reaction solution. Next oxygen alone is bubbled into the solution for about one-half hr to allow complete reaction of the dinitrogen tetroxide with the 1,2-polybutadiene. The nitrooxidized polymer product having recurring units of the formula:

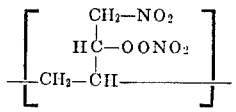

is recovered by stripping the solvent from the reaction mixture - yield: 5.9 g.

EXAMPLE XIII-B

Nitrooxidized Poly(5-Methylidene-2-Norbornene)

A total of 5.0 g of polymerized 5-methylidene-2-norbornene having a molecular weight of about 29,000 and 120 ml of n-pentane are added to a resin kettle equipped with a reflux condenser, a thermometer, mechanical stirrer and a gas inlet tube. The polymer is dissolved in the solvent by stirring the mixture at room temperature following which the solution is cooled to ice bath temperature while purging it with oxygen (one-half hr). A stream of oxygen at a rate of 40 ml/min (STP) is passed over liquid dinitrogen tetroxide maintained in a graduated cylinder and the resultant gaseous mixture (N$_2$O$_4$/O$_2$) is conducted into the reaction solution (at ice bath temperature) through the gas inlet tube. Over a period of about 7.5 min a total of 0.35 ml of liquid dinitrogen tetroxide is transferred to the reaction solution. To permit complete reaction of the dinitrogen tetroxide with the polymer, oxygen alone is bubbled into the solution for about three-fourth hr. Stripping of the solvent from the reaction mixture yields about 5.3 g of a nitrooxidized polymer having units of the formula:

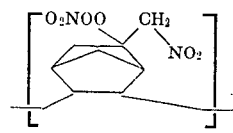

EXAMPLE XIII-C

Nitrooxidized Ethylene/1-Butene/5-Isopropylidene-2-Norbornene Terpolymer

A total of 110 ml of n-hexane together with 5.0 g of a terpolymer of ethylene/1-butene/5-isopropylidene-2-norbornene (molecular weight 32,000) are added to a resin kettle equipped with a reflux condenser, a thermometer, a mechanical stirrer, and a gas inlet tube. After the polymer is dissolved by stirring the mixture at room temperature the solution is cooled to about 5°C while purging it with oxygen (three-fourth hr). A stream of oxygen at the rate of 60 ml/min (STP) is passed over liquid dinitrogen tetroxide held in a graduated container and the gaseous mixture thus formed is transferred into the reaction solution through the gas inlet tube. In this manner, 0.3 ml of liquid dinitrogen tetroxide is conducted into the reaction solution over a period of about 10 min. Oxygen alone is then bubbled into the solution for about one-half hr to permit complete reaction of the dinitrogen tetroxide with the terpolymer. After stripping the solvent a total of about 5.1 g of nitrooxidized terpolymer in which the recurring norbornene units have the formula:

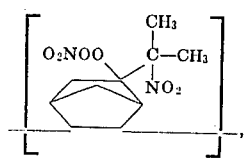

is recovered.

EXAMPLE XIV-XVI

In this series the grafting of butyl methacrylate, lauryl methacrylate and a mixture of lauryl methacrylate and butyl methacrylate, respectively, to an ethylene/propylene/5-ethylidene-2-norbornene terpolymer having a molecular weight of about 76,000 (EPsyn 40-A) was demonstrated. The nitrooxidation step (first stage reaction) was conducted by stirring a solution of the polymer (9.4 weight percent in heptane) and dinitrogen tetroxide (about $1.0 \times 10^{-4}$ mole per gram of polymer) for five minutes at 0°–5° under an oxygen atmosphere. The acrylate monomer (10 ml/g polymer) was added to the reaction solution, the system was placed under a nitrogen atmosphere and heated to bring about the second stage polymerization and graft reaction. Recovery of the graft copolymer was accomplished by adding methanol to the reaction mixture to precipitate the graft copolymer which was purified by dissolution in benzene and reprecipitation with methanol. Other pertinent details relating to these three example are found in Table 2.

TABLE 2

METHACRYLATE GRAFT COPOLYMERS

| Ex. | Monomer[1] | Graft Conditions Temp (°C) | Graft Conditions Time (hr) | Monomer Conversion (%) | Polymer Wt Increase (%) |
|---|---|---|---|---|---|
| XIV | BMA | 100 | 7 | 34.0 | 306 |
| XV | LMA | 100 | 7 | 45.0 | 400 |
| XVI | LMA-BMA[2] | 80 | 5 | 20.0 | 180 |

[1]BMA and LMA stand for butyl and lauryl methacrylates, respectively.
[2]LMA-BMA molar ratio of 1.47:1.

EXAMPLES XVII-XXIV

In a final series of examples, the effect of temperature on graft reactions of nitrooxidized ethylene/propylene/5-ethylidene norbornene (mol. wt 76,000) EPsyn 40-A) was demonstrated. The nitrooxidation products (first stage) were prepared in the same manner as in Examples XIII–XVI and in the second stage lauryl methacrylate was graft polymerized to the nitrooxidized backbone polymer. Pertinent details relating to these examples are presented in Table 3. The data indicate that the methacrylate conversion increases from 22 percent at 80°C to about 70 percent at 110°C and then declines slightly to 60–64 percent at 130°C. The polymer weight increase climbs from about 192 percent at 80°C up to 618 percent at 110°C and then drops back to 532–560 percent at 130°C.

TABLE 3

EFFECT OF GRAFT REACTION[1] TEMPERATURE ON LAURYL METHACRYLATE CONVERSION

| Example | Temperature (°C) | Methacrylate Conversion (%) | Polymer Wt. Increase (%) |
|---|---|---|---|
| XVII | 80 | 22 | 192 |
| XVIII | 80 | 26 | 232 |
| XIX | 90 | 45 | 400 |
| XX | 100 | 45 | 400 |
| XXI | 110 | 70 | 618 |
| XXII | 120 | 67 | 590 |
| XXIII | 130 | 60 | 532 |
| XXIV | 130 | 64 | 560 |

[1]Carried out with solution containing 5.0 g nitro-oxidized EPsyn 40-A, 50 ml of lauryl methacrylate and 70 ml of n-heptane or n-decane for 7 hr.

The graft copolymers of this invention may be utilized to prepare rod, sheet and parts such as horn buttons, instrument panels and medallions, safety guards, brush backs, costume jewelry, decorative parts, parts for home appliances, reinforced plastics, etc. with high tensile and impact strengths, by extrusion or molding at pressures ranging from about 500 to 15,000 psi or more at temperatures of from about 100° to about 250°C. Lubricants, plasticizers, modifiers, fillers, coloring matter may be added to the copolymer compositions as required as will be appreciated by those skilled in the art. In general, the graft copolymers of this invention can be employed wherever impact-resistant resins (e.g., ABS resins, high-impact polystyrene) are now used. When used in place of resins containing SBR or nitrile rubbers, they yield products with improved aging and ozone resistance.

A reinforced plastic sheet composition possessing excellent mechanical and abrasive properties can be prepared by mixing about 20 parts by weight of glass fiber and about 100 parts by weight of polyvinyl formal together with about 100 parts by weight of the graft copolymer of Example II in a Banbury mixer and then passing the mixture through a three-roll vertical calender.

The graft copolymers of this invention are also useful for wire and cable covering. For example, clear copper wire (10 gage) can be passed through a bath containing a 15 percent by weight solution of the copolymer composition of Example X in monochlorobenzene at a temperature of 40°C and afterwards passing the treated wire through a dryer maintained at 85°C to yield an insulated wire having a highly flexible copolymer coating useful in a variety of electrical applications.

What is claimed is:

1. A nitrooxidized polymer selected from the group consisting of
  A. a polymer comprising recurring units of the formula:

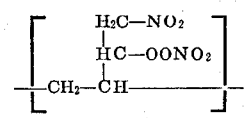

B. a polymer consisting of recurring units of the formula:

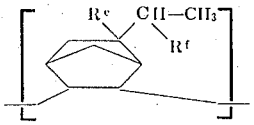

wherein $R^e$ and $R^f$ are independently selected from the group consisting of $OONO_2$ and $NO_2$ and with the proviso that when $R^e$ is $OONO_2$ then $R^f$ is $NO_2$ and when $R^e$ is $NO_2$, then $R^f$ is $OONO_2$, and
  C. a polymer comprising recurring units of a terpolymer of ethylene, propylene and units of the formula:

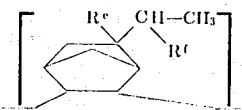

wherein $R^e$ and $R^f$ have the same meaning as previously described in (B) above.

2. The polymer of claim 1 wherein the polymer comprises recurring units of the formula:

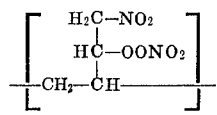

3. The polymer of claim 1 wherein the polymer is a terpolymer of ethylene, propylene and units of the formula:

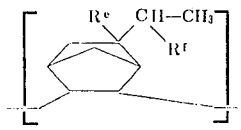

wherein $R^e$ and $R^j$ are independently selected from the group consisting of $OONO_2$ and $NO_2$ and with the proviso that when $R^e$ is $OONO_2$ then $R^j$ is $NO_2$ and when $R^e$ is $NO_2$ then $R^j$ is $OONO_2$.

* * * * *